(12) United States Patent
McCurry et al.

(10) Patent No.: US 11,153,071 B2
(45) Date of Patent: *Oct. 19, 2021

(54) CITATION AND ATTRIBUTION MANAGEMENT METHODS AND SYSTEMS

(71) Applicant: ARTIFACTSOFRESEARCH, INC., Alexandria, VA (US)

(72) Inventors: Kevin Joseph McCurry, Winchester, MA (US); David Lee Kochalko, Encinitas, CA (US); Marcos Vincente Blanco, Alexandria, VA (US)

(73) Assignee: ARTIFACTSOFRESEARCH, INC., Alexandria, VA (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/574,278

(22) Filed: Sep. 18, 2019

(65) Prior Publication Data

US 2020/0014530 A1   Jan. 9, 2020

Related U.S. Application Data

(63) Continuation of application No. 16/339,595, filed as application No. PCT/US2018/042096 on Jul. 13, 2018, now Pat. No. 10,476,668.

(Continued)

(51) Int. Cl.
*G06F 21/60* (2013.01)
*H04L 9/32* (2006.01)
(Continued)

(52) U.S. Cl.
CPC ............ *H04L 9/0637* (2013.01); *G06F 21/16* (2013.01); *G06F 21/602* (2013.01); *G06F 21/62* (2013.01);
(Continued)

(58) Field of Classification Search
CPC ... H04L 9/32; H04L 9/34; H04L 63/12; G06F 21/60

See application file for complete search history.

(56) References Cited

U.S. PATENT DOCUMENTS

2015/0332283 A1   11/2015   Witchey
2017/0161439 A1   6/2017    Raduchel et al.
(Continued)

FOREIGN PATENT DOCUMENTS

JP   2013528885   9/2016

OTHER PUBLICATIONS

International Application No. PCT/US18/42096, International Search Report and Written Opinion of the International Searching Authority, dated Oct. 5, 2018, 7 pages.

*Primary Examiner* — Izunna Okeke

(74) *Attorney, Agent, or Firm* — Morgan, Lewis & Bockius LLP

(57) ABSTRACT

A computer-implemented method comprising: accessing, at a client device, a first artifact and artifact metadata corresponding to the artifact; creating, at the client device, an artifact cryptographic digest corresponding to the artifact to certify existence of the artifact; transmitting, at the client device, the artifact cryptographic digest and artifact metadata to a server; adding, at the server device, the artifact cryptographic digest to a block chain; and adding, at the server device, the artifact cryptographic digest, the artifact metadata and the first artifact to a data storage device separate and distinct from the block chain to reference the artifact cryptographic digest on the block chain.

10 Claims, 7 Drawing Sheets

Related U.S. Application Data

(60) Provisional application No. 62/644,703, filed on Mar. 19, 2018, provisional application No. 62/532,967, filed on Jul. 14, 2017.

(51) Int. Cl.
*H04L 9/06* (2006.01)
*G06F 21/64* (2013.01)
*G06F 21/16* (2013.01)
*G06F 21/62* (2013.01)

(52) U.S. Cl.
CPC ............ *G06F 21/64* (2013.01); *H04L 9/3236* (2013.01); *H04L 9/3297* (2013.01); *H04L 2209/38* (2013.01)

(56) References Cited

U.S. PATENT DOCUMENTS

2018/0152442 A1* 5/2018 Buldas ............... G06F 21/64
2018/0341701 A1* 11/2018 Verma ............... G06F 16/3344
2018/0349572 A1* 12/2018 Chen ............... G06Q 30/06

* cited by examiner

CITATION AND ATTRIBUTION MANAGEMENT METHODS AND SYSTEMS

CROSS-REFERENCE TO RELATED APPLICATIONS

This application continuation of U.S. patent application Ser. No. 16/339,595, filed Apr. 4, 2019 which is a U.S. National Phase Application under 35 U.S.C. 371 of International Application No. PCT/US2018/042096 filed Jul. 13, 2018, which claims the benefit of U.S. Provisional Patent Application No. 62/532,967 filed Jul. 14, 2017 entitled "RESEARCH ARTIFACT TRANSACTION SYSTEM AND METHOD", and U.S. Provisional Patent Application No. 62/644,703 filed Mar. 19, 2018 entitled "CITATION AND ATTRIBUTION MANAGEMENT METHODS AND SYSTEMS", each of which are incorporated by reference herein in their entireties.

BRIEF DESCRIPTION OF THE SEVERAL VIEWS OF THE DRAWINGS

The following detailed description of embodiments of the citation and attribution management methods and systems, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

Figure 1:
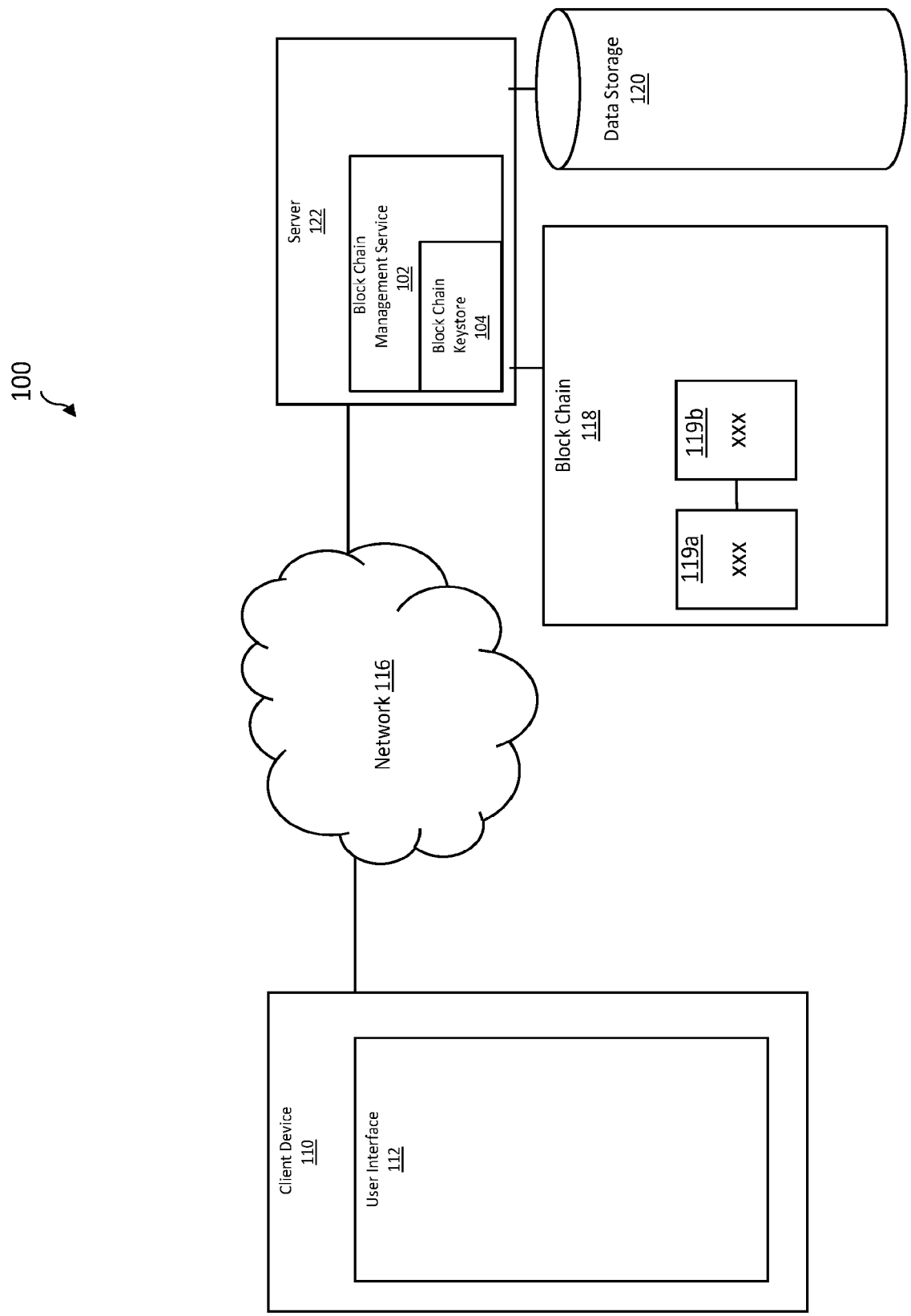
FIG. 1 shows a block diagram of a system for allowing users to communicate with a server over data transmitted over a network according to at least some embodiments of the invention.

In certain areas, such as academia, a value of a person's contribution to the respective area is primarily based on two factors: how many published works did the person create, and how many times were the person's published works cited by others. There are a few issues with this approach. For the first issue, the person may create a work that cannot be publicly disseminated, but the person may still desire to make the work available to a select few people so that the person can still be cited in another person's future work. For example, the user may be a researcher that conducted a study containing data valuable to others. The researcher may desire to save a record of the data so that the researcher has proof of existence and can establish provenance. The researcher may also desire to save the record of the data so that others can cite to the data and the researcher could receive proper attribution. For the second issue, because publishing is of great importance, authors in certain fields will submit their works to publishing companies with the hope of having their works published. But publishing companies' interests might not align with that of the authors. For example, the publishing companies will only seek to publish author works that the publishing companies deem interesting to their readers. Also, because publishing takes so long the academic may want to disseminate their research to be discovered and cited long before the formal publishing takes place. As a result, there are a number of author works that are not published, but the authors would like to make available to others so that the respective author's work can still be counted as a contribution to the author's field and that work can still be cited by others.

By utilizing a block chain configuration, embodiments of the system described herein can provide a permanent immutable record of all created works that anyone can use to prove or verify that they created a particular work on a particular date. The block chain configuration also allows others to cite to particular works (even if not published) so that the original author can receive proper attribution. Such a system incentivizes authors to share access to their works, even when the works are not published.

Embodiments of the system described herein also improve citation and attribution for published works as many published articles are not indexed by solutions that currently track citations and attributions. Further, even for articles that are indexed, the system would detect these citations sooner, would be fully machine readable, and would not be susceptible to citation breaks/errors that are typically associated with these indexing. Additionally, the system generated citation data and counts can create improved metrics, analytics, reputational graphs, and search capabilities as more citations and more meta-data and context about the citations can be captured at the time of attribution through such a system which cannot be done with current solutions. For example, citing reasons or weighting of attribution across authors associated with the cited document can be incorporated into meta-data at the time of attribution by the system which cannot currently be captured with current indexes.

Figure 2A:
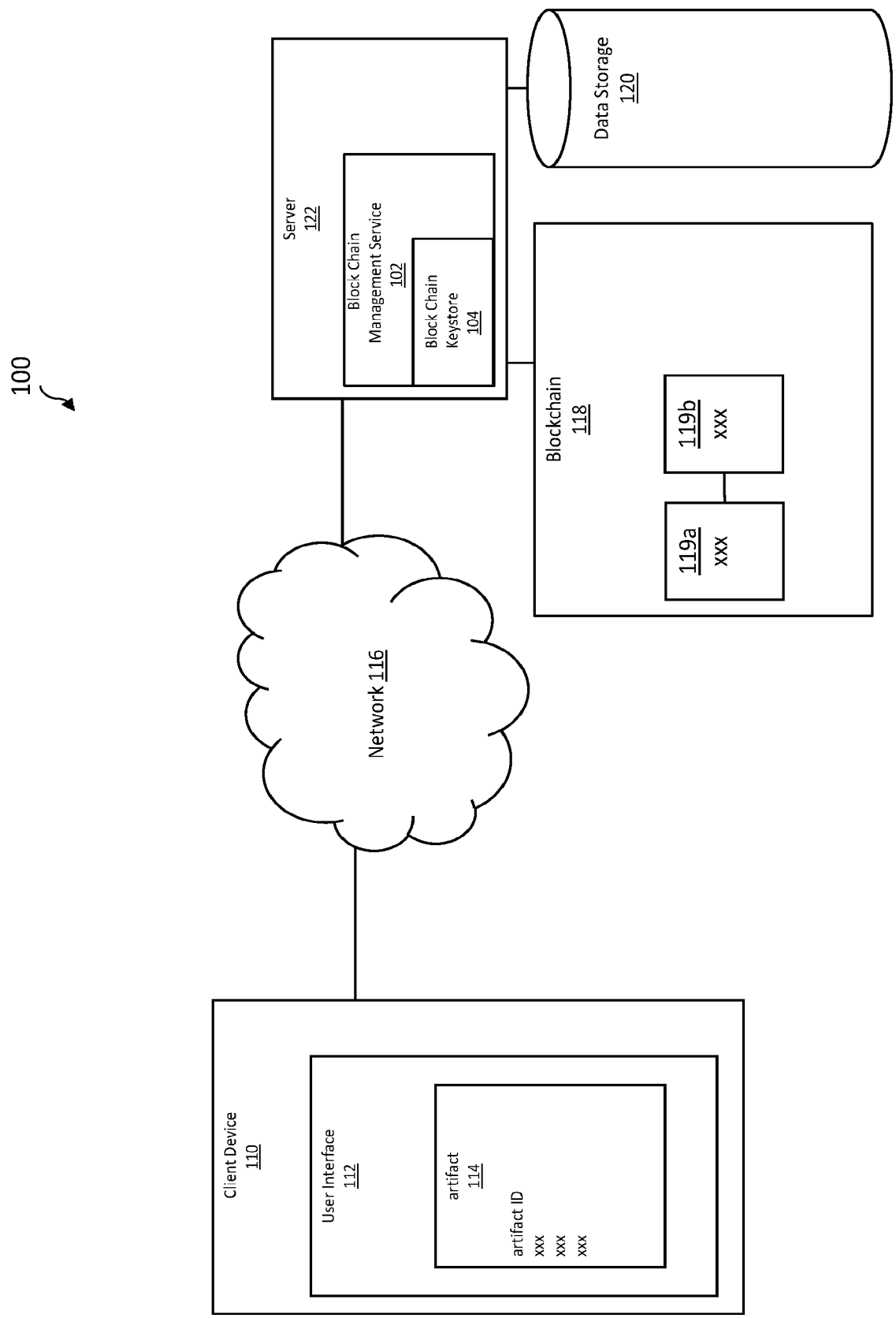
FIGS. 2A-2F show exemplary representations of the system of FIG. 1, according to at least some embodiments of the invention.
Figure 2B:
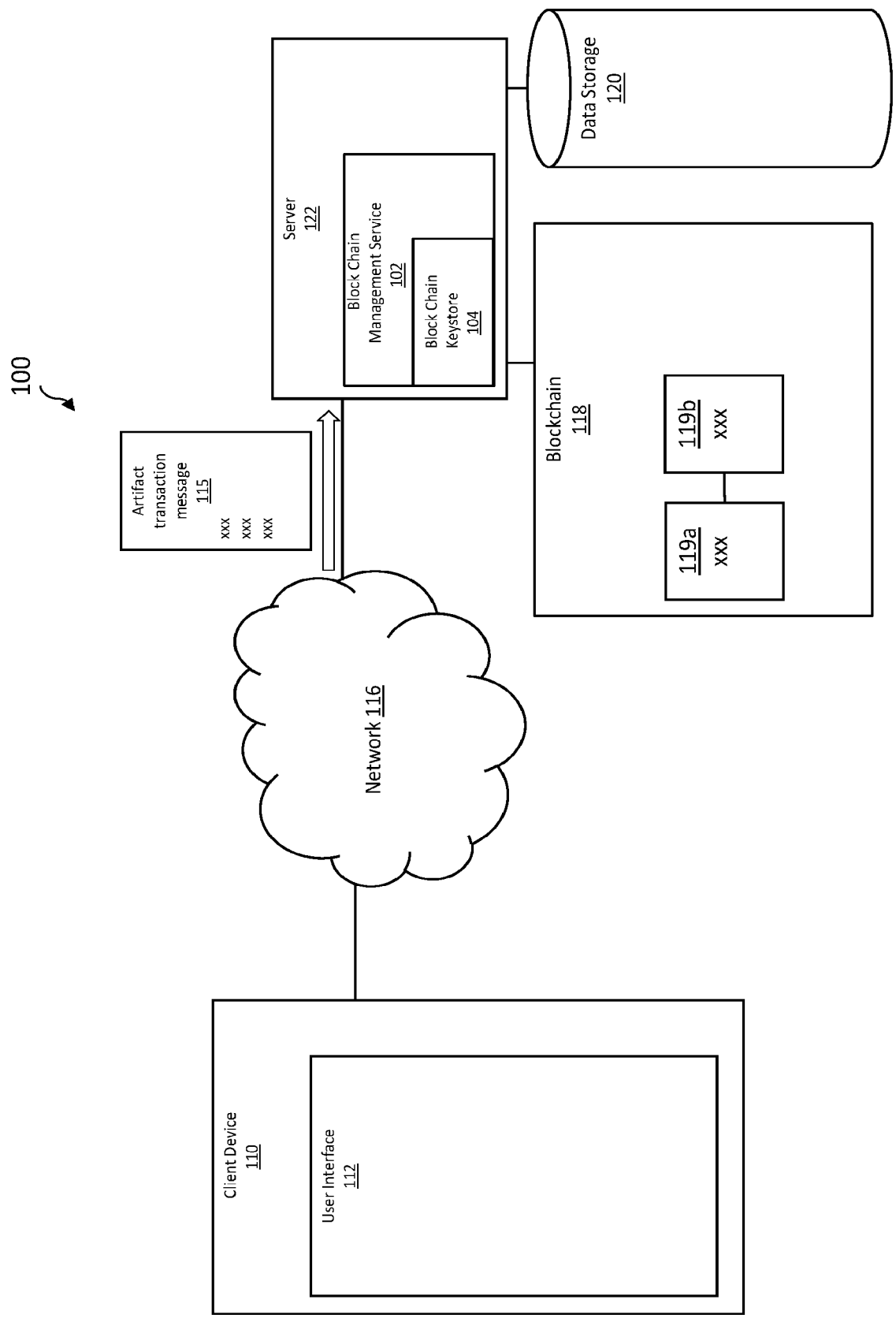
Figure 2C:
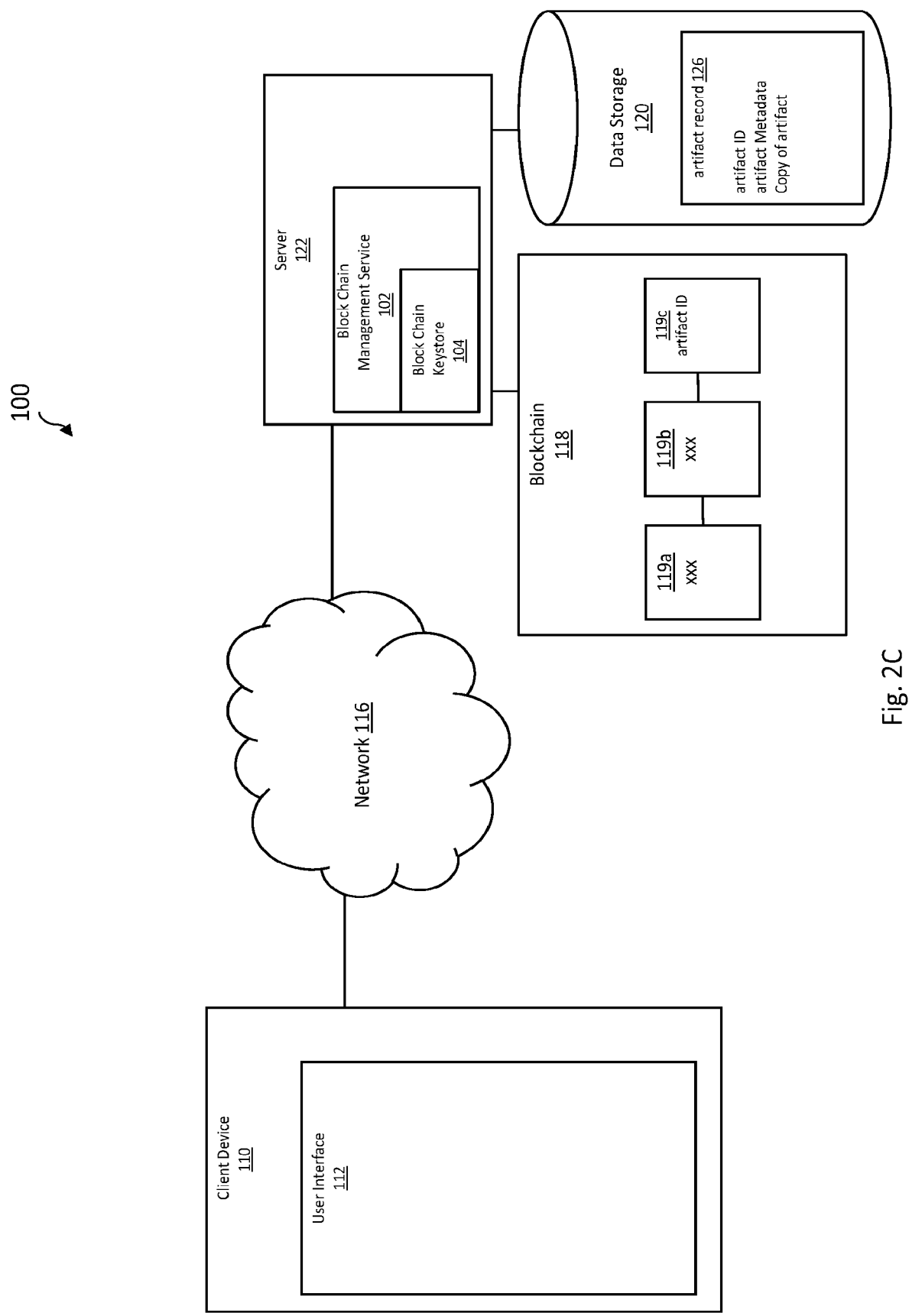
Figure 2D:
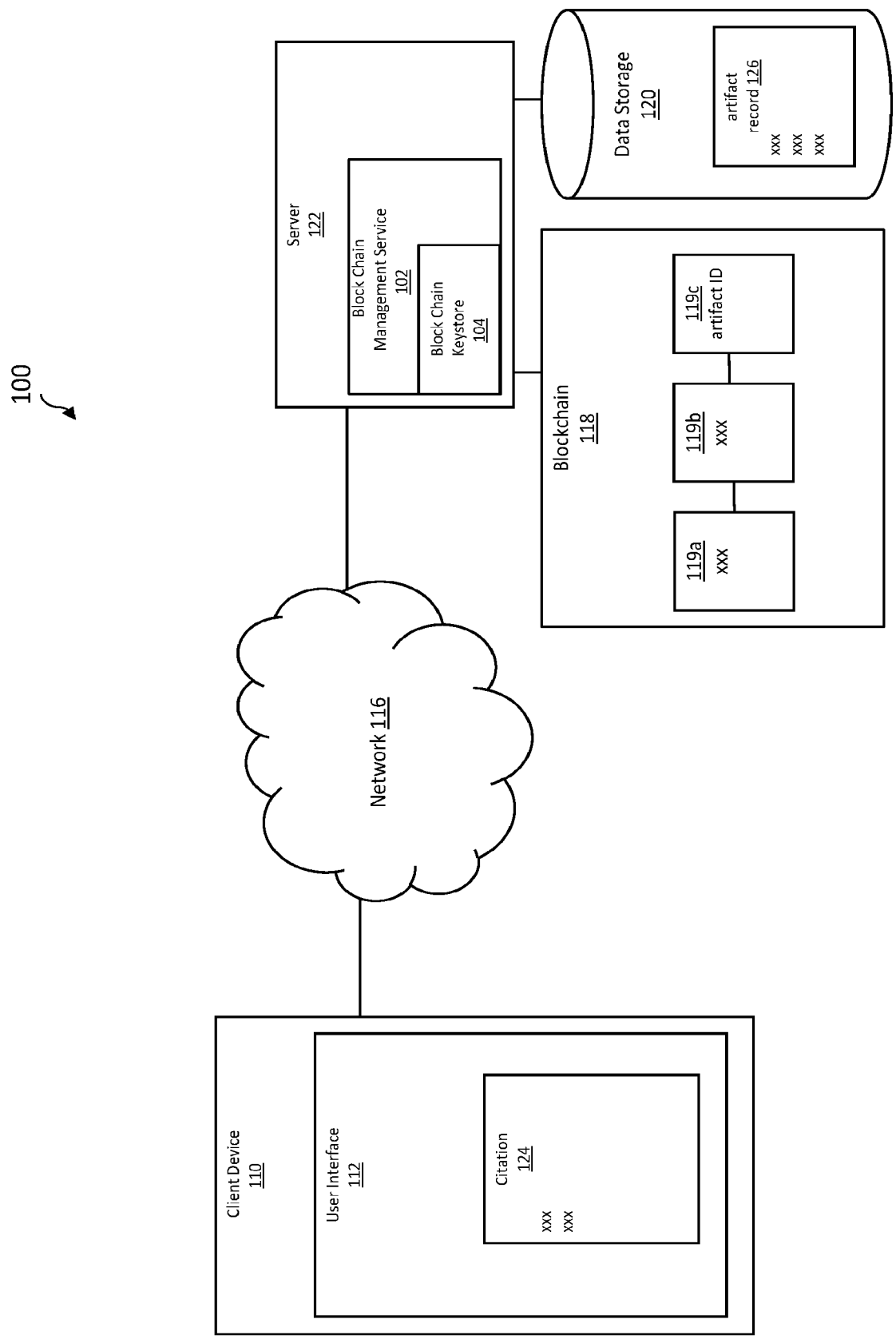
Figure 2E:
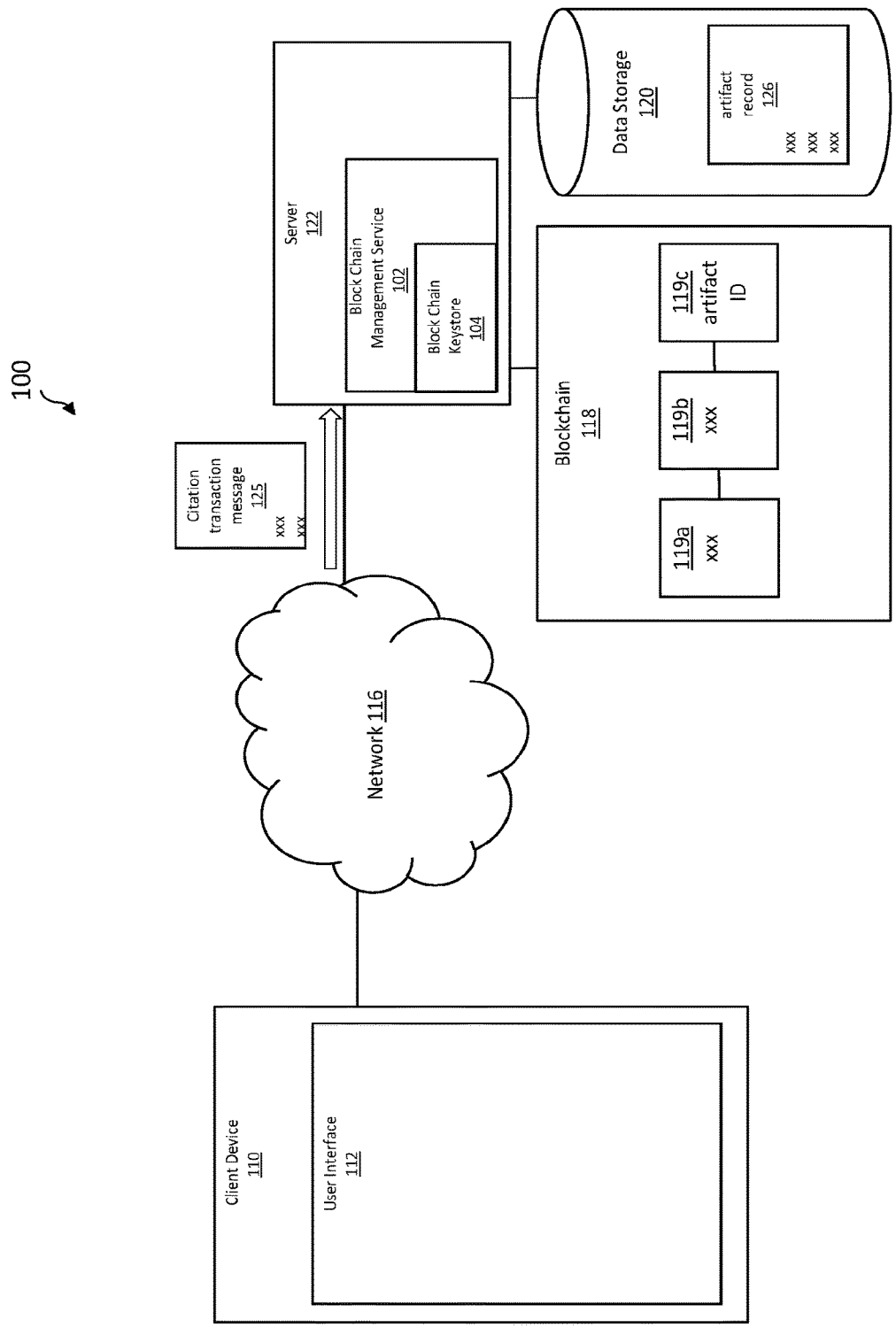
Figure 2F:
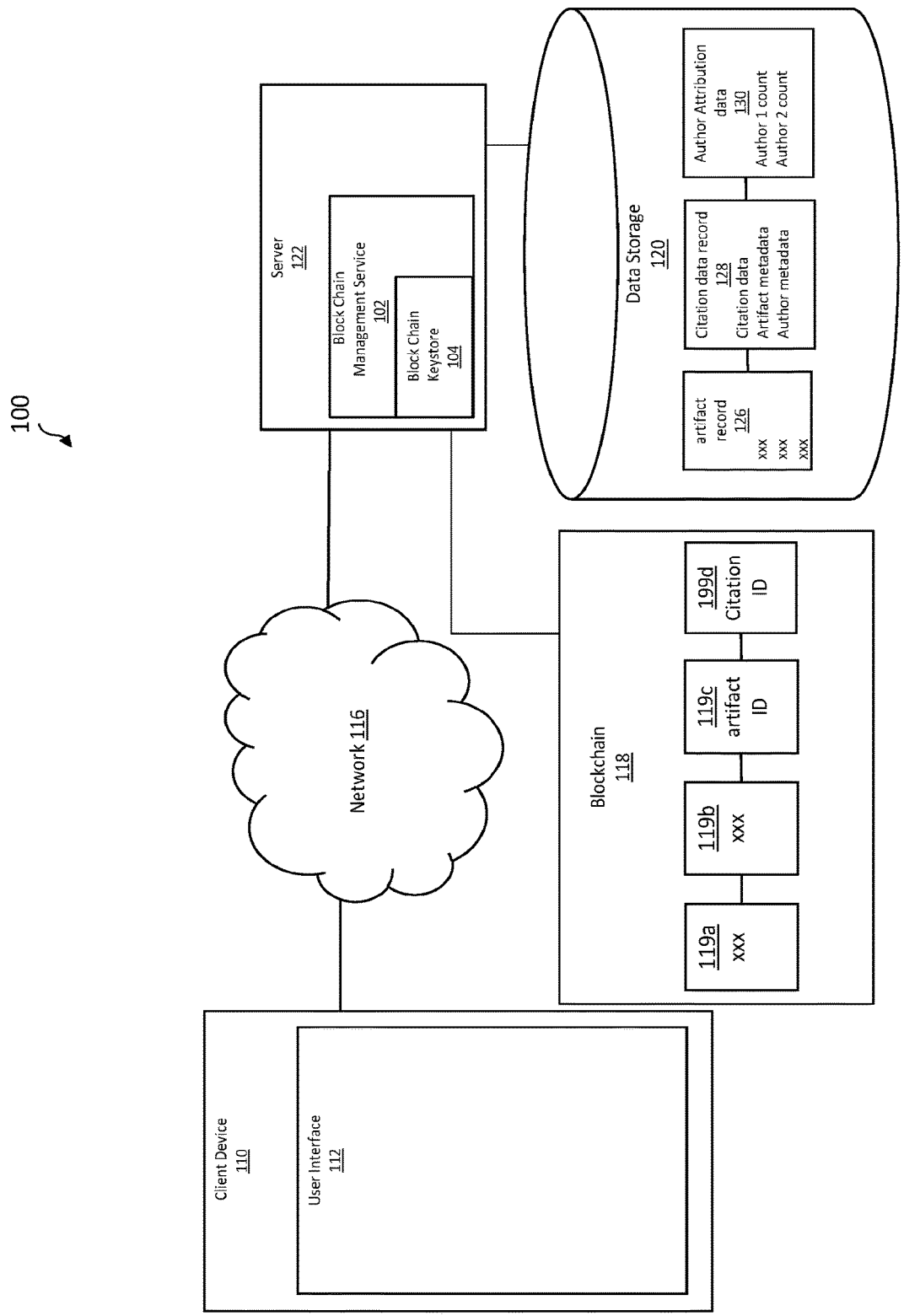

Referring to the drawings in detail, wherein like reference numerals indicate like elements throughout, there is shown in FIGS. 1-2F a system illustrating methods for citation and attribution management, generally designated, in accordance with an exemplary embodiment of the present invention.

Referring to FIG. 1, there is shown a block diagram of a system 100 for allowing users to create artifacts, update citations and track author attribute information according to at least one embodiment of the invention. System 100 may include client device 110, network 116 and/or server 122.

Client device 110 may be any computing device configured to execute computer programs as well as store and process data. Examples of client device 110 include a phone, tablet, computer, smart phone, or a smart device.

Client device 110 may include user interface 112. User interface 112 may be a program that controls a display (not shown) of client device 110. User interface 112 may include one or more peripheral user interface components, such as a keyboard or a mouse. The user may use the peripheral user interface components to interact with client device 110. User interface 112 may receive user inputs, such as mouse inputs or keyboard inputs from the mouse or keyboard user interface components. User interface 112 may be any word processing program, such as Microsoft Word.

Network 116 allows data to be transferred between client device 110 and server 122. Network 116 connects client device 110 with external devices by carrying signals. Network 116 may be implemented using wire or cable, fiber optics, a phone line, a wireless link, a cellular phone link, a radio frequency link, or any other suitable communication channel. For instance, network 116 may be implemented using a combination of channels. Network 116 may be implemented as an intranet and/or or an internet.

Server 122 may include communication infrastructure, processor, memory and communication interface. Server 122 may be any computing device for receiving and/or responding to requests for data from client device 110. Examples of data may include web page data, hypertext markup language (HTML), text, video, picture, software, executable, interpretable, byte-code, and binary files.

Server 122 may include block chain 118. Block chain 118 may be a list of records (i.e., blocks 119) that are temporally linked. Each block may contain a link to a previous block, a timestamp indicating when the block was created and any transaction data (e.g., artifact-related data). The block chain 118 may be an immutable record, impervious to modifications of stored transaction data because any given block cannot be altered retroactively without the alteration of all subsequent blocks.

Server 122 may include data storage 120. Data storage 120 may be a storage medium configured to record and store data. Examples of data storage 120 may be optical discs, flash memory, hard disk drives, zip drives, among others. The data storage 120 may be configured as a cloud database, an in-memory database, a distributed database or a hierarchical database, such as a relational database.

Server 122 may include a block chain management service 102 and/or a block chain keystore 104. The block chain management service 102 may be a component of server 122 that manages the interactions between the client device 110 and the block chain 118. The block chain management service 102 may allow a user via the client device 110 to interact with the block chain 118 through client applications or through third-party applications at the client device 110 which leverage an application platform interface (API) of the server 122.

Examples of the functionality of at least some embodiments of the invention are provided below in more detail.

1 Create Artifact

In some embodiments, the system 100 allows one or more users to create a record of an artifact that is stored on the block chain. As used herein, an artifact may refer to any object created by a human being. Examples of artifacts may include: publications, articles, manuscripts, books, conference papers, dissertations, preprints, data sets, clinical trial data, protocols, genetic and chemical structures, grants (e.g., applications, awards), graphs, images, recordings, patents, posters, presentations, projects, reports, theses, working papers, retractions, and software.

Initially, the user interface 112 may receive a request by a user to create a record of the artifact. FIG. 2A shows that the user has created an artifact 114 that the user desires to submit for recordation.

After receiving the request, the user interface 112 may access the artifact 114 and create an artifact cryptographic digest corresponding to the artifact 114. As used herein, a cryptographic digest may refer to a unique value used to certify an object's (e.g., artifact's) existence and/or authorship. The cryptographic digest may be mapped from the data of an object using a cryptographic digest function. An example of a cryptographic digest function may include a cryptographic hash function (e.g., sha256). Examples of a unique value may include an object identifier or object hash. As used herein, the term "artifact cryptographic digest," may also be described as an "artifact identifier" and "artifact hash", and these terms may be used interchangeably.

The user interface 112 may prompt the user to enter additional artifact metadata about the artifact 114. The system may generate metadata based on data extracted from the artifact 114 or other sources. As used herein, metadata may be data that describes and gives information about other data. Examples of artifact metadata may include project name, component name, file name, contributor (e.g., author/owner/creator) names, contributor roles, contributor types, level of contribution for each contributor, artifact type (e.g., publication, patent, data, protocol, patient registry, application/code, video, audio), description (e.g., keywords, abstract), artifact title, location (e.g., DOI, address or link to artifact location), use rights (e.g., established by authors or indication that it is copyrighted in the case of commercially owned/copyrighted materials), disclosure level (e.g., whether contributor wishes to remain anonymous or disclosed), file date, and stage of development (e.g., working paper, preprint, published). In some embodiments, the minimum amount of artifact metadata includes artifact type, stage of development, location, description, contributor names, use rights, and disclosure level.

The user interface 112 may prompt any or all contributors of the artifact to submit a contributor digital signature to confirm that the contributor contributed to the artifact.

The user interface 112 may transmit an artifact transaction message to server 122. The artifact transaction message may include the artifact hash, and the artifact metadata. In some embodiments, the artifact transaction message may also include the artifact. FIG. 2B show an example of an artifact transaction message 115 for an artifact 114 being submitted by the user interface 112 to server 122.

After receiving the artifact transaction message 115, the server 122 may add the artifact hash to block chain 118 by adding a new transaction block with the artifact hash to the block chain 118. The server 122 may add the artifact metadata (and, in some embodiments, the artifact 114) to data storage 120, with the artifact hash as the database key. The server 122 may add a reference to a location of the artifact (stored at a third party device) and/or the artifact to the data storage 120. FIG. 2C shows an example of server 122 adding a transaction block 119*c* to the block chain 118. The transaction block 128 includes the artifact hash (artifact ID). FIG. 2C also shows an example of an artifact record 126 being created in data storage 120. The artifact record 126 includes the artifact hash, artifact metadata and a copy of the artifact 114.

After updating the block chain 118, the server 122 may broadcast a block confirmation establishing transaction order in a shared transaction ledger among other devices. The server 122 may also transmit a confirmation to the client device 110 confirming that the artifact has been recorded successfully. The confirmation may include a time stamp to indicate the time when the artifact was recorded successfully on the block chain 118.

2 Artifact Citations

In some embodiments, the system 100 may provide a mechanism that allows a user to cite to other artifacts, including artifacts referenced on the block chain 118.

While the user creates a new work having citations, the user interface 112 may read and inspect the citation data corresponding to the citations. Examples of citation data may include an artifact identifier corresponding to the cited artifact and authorship and/or ownership information corresponding to the owner of the cited artifact. The citation data may also include artifact metadata and/or author metadata. Examples of artifact metadata may include the artifact hash, artifact location (e.g., where the artifact can be obtained), and artifact type. Examples of author metadata may include author identifiers of each author associated with the artifact 114.

The user interface 112 may then transmit citation data corresponding to the citations to a server 122 to determine whether the citation data matches metadata for any artifacts stored at the server 122. If the server 122 determines that the citation data matches metadata for any artifacts stored at the server 122, the server 122 sends a "citation match" message to the user interface 112 to inform the user interface 112 that a match was identified. If the server 122 determines that the citation data does not match metadata for any artifacts stored at the server 122, the server 122 sends a "citation non-match" message to the user interface 112 to inform the user interface 112 that a match was not identified.

The user interface 112 may periodically read and inspect the citation data. Alternatively, the user interface 112 reads and inspects the citation data in response to a user request.

The user interface 112 may create and maintain a citation table representative of the citation data. The citation table may include at least one of: citations that match an existing artifact record on the block chain 118, citations identified on reference Abstracting and Indexing (A&I) database, and citations that do match any existing artifacts on the block chain 118. In some embodiments, the citation data contains at least some of the data represented by the citation table (e.g., citations that match an existing artifact and/or citations that do not match an existing artifact). In some embodiments, the user interface 112 may present the unmatched citations to the user so that the user, if desired, may match the unmatched citations to citations known to the user.

In some embodiments, the user interface 112 may receive a request to post the citations on the block chain 118. FIG. 2D shows that the user has created citations 124 for an artifact that the user would like to submit for recordation.

The user interface 112 may initially re-read and re-inspect the citation data (e.g., the citation table). If necessary, the user interface 112 may update the citation table if there is a determination that a citation that previously did not match any artifacts in the block chain 118, now does match an artifact, or vice versa.

The user interface 112 may create a citation cryptographic digest corresponding to the citation data, using the processes described herein. As used herein, the term "citation cryptographic digest," may also be described as an "citation identifier" and "citation hash", and these terms may be used interchangeably.

The user interface 112 may prompt any contributors of the artifact to submit a contributor digital signature to confirm that the contributor contributed to the artifact that contains the citations.

The user interface 112 may transmit a citation transaction message to a server. The citation transaction message may include the citation data and the citation hash. FIG. 2E show an example of a citation transaction message 125 for a citation being submitted by the user interface 112 to server 122.

After receiving the citation transaction message, the server may add the citation hash to block chain 118 by adding a new transaction block to the block chain 118. The server may add the citation data to data storage 120, with the citation hash as the database key. FIG. 2F shows an example of server adding a transaction block 119*d* to the block chain 118. The transaction block 128 includes the citation hash (citation ID). FIG. 2F also shows an example of a citation data record 128 being created in data storage 120. The citation data record 128 includes the citation data, artifact metadata and an author metadata. It is understood that in other embodiments, other combinations of data may be stored in a citation record including any combination of the following: citation data, artifact metadata, artifact metadata hash, author metadata, and author metadata hash.

After updating the block chain 118, the server 122 may broadcast block confirmation establishing transaction order in a shared transaction ledger among other devices. The server 122 may transmit a confirmation to the client device 110 confirming that the artifact has been recorded successfully. The confirmation may include a time stamp to indicate the time when the artifact was recorded successfully on the block chain 118.

In some embodiments, the server 122 may update an author attribution data count based on the citation data. For example, as shown in FIG. 2F, the server 122 has stored author attribution data 130 for each author of any artifact in the block chain 118. If the citation data received in a citation transaction message (e.g., citation transaction message 125 in FIG. 2E) cites to an artifact in the block chain 118, the author attribution count (e.g., stored in the author attribution data 130) for each author of the cited artifact is incremented. The author attribution count may represent a number of instances where a respective artifact of the author has been cited by another artifact. In some embodiments, for each citation, the author attribution count for each author is incremented by one. In some embodiments, for each citation, the author attribution count for each author is incremented by a predetermined fraction representing the author's percentile contribution to the artifact. For example, if a first author's contribution to an artifact was predetermined to be 75% and a second author's contribution to an artifact was predetermined to be 25%, then the first author's attribution count would increase by 0.75 and the second author's attribution count would increase by 0.25 for each citation.

3 New Version of an Artifact

The system 100 may be configured to allow a user to create new version of an already-existing artifact if the user so desires.

Initially, the user interface 112 may receive a request by a user to create a new version of an already-existing artifact.

In response, the user interface 112 may present artifact metadata to the user for confirmation that the artifact metadata is applicable to the new version of the artifact. If desired, the user may change the artifact metadata using the user interface 112.

The user interface 112 may prompt any contributors of the artifact to submit a contributor digital signature to confirm that the contributor contributed to the artifact.

The user interface 112 may access the new version of the artifact and create an artifact cryptographic digest corresponding to the new version of the artifact, as described herein.

The user interface 112 may read and inspect the citation data corresponding to the citations, as described herein.

The user interface 112 may transmit an artifact transaction message and citation transaction message to server 122, as described herein.

After receiving the artifact transaction message and citation transaction message, the server 122 may add the artifact hash for the new version of the artifact to block chain 118, as described herein. The server 122 may also add the citation hash for the new version of the artifact to block chain 118, as described herein. The server 122 may add the artifact metadata and the citation data (and, in some embodiments, the artifact 114) to data storage 120.

After updating the block chain 118, the server 122 may broadcast a block confirmation establishing transaction order in a shared transaction ledger among other devices. The server 122 may also transmit a confirmation to the client device 110 confirming that the artifact and citation data has been recorded successfully. The confirmation may include a time stamp to indicate the times when the artifact and citation data was recorded successfully on the block chain 118.

4 Updating Artifact Metadata

The system 100 may be configured to allow a user to update artifact metadata of an already-existing artifact if the user so desires.

Initially, the user interface 112 may receive a request by a user to update artifact metadata for a specific artifact.

In response, the user interface 112 may present artifact metadata to the user. If desired, the user may submit requests to change the artifact metadata using the user interface 112.

The user interface 112 may prompt any contributors of the artifact to submit a contributor digital signature to confirm that each contributor agrees with the updates to the artifact metadata.

The user interface 112 may transmit an artifact transaction message to server 122. The artifact transaction message may include the artifact hash, and the artifact metadata.

After receiving the artifact transaction message, the server 122 may add the artifact hash to block chain 118 by adding a new transaction block with the artifact hash to the block chain 118. The server 122 may add the updated artifact metadata to data storage 120, with the artifact hash as the database key.

After updating the block chain 118, the server 122 may broadcast a block confirmation establishing transaction order in a shared transaction ledger among other devices. The server 122 may also transmit a confirmation to the client device 110 confirming that the artifact has been recorded successfully. The confirmation may include a time stamp to indicate the time when the artifact was recorded successfully on the block chain 118.

5 Batch Citation Checking

As discussed above, in some embodiments, citations submitted to the block chain 118 may include unmatched citations. An unmatched citation may cite to an artifact that does not include a respective artifact cryptographic digest stored on the block chain. The unmatched citations may be stored in data storage 120 for further processing. In some embodiments, at predetermined time intervals (e.g., once per day), the server 122 may compare the unmatched citations to new artifacts stored on the block chain 118 during the previous period of time. If the server 122 detects a match, the server 122 may update (e.g., increment) an author attribution data count based on the new citation data, as described herein.

6 Additional Embodiments

The functionality that the block chain management service 102 may provide may include:

1) Ability for a user to save a record to the block chain without having to maintain a personal wallet to store their personal and public keys.

2) Ability for the user to retrieve their information from the block chain without managing a personal wallet to store their public and private keys.

3) Mapping service that allows changes to the underlying block chain not to necessitate changes by end users.

4) Data aggregation services to give the end user access to information that is stored in multiple locations including, identity service providers, publishing information stores and scientific blockchains.

In one embodiment, the system 100 includes one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A system comprising:
one or more memory units each operable to store at least one program; and
at least one processor communicatively coupled to the one or more memory units, in which the at least one program, when executed by the at least one processor, causes the at least one processor to perform the steps of:
accessing, at a client device, a first artifact and artifact metadata corresponding to the artifact;
creating an artifact cryptographic digest corresponding to the artifact to certify existence of the artifact;
adding, at the server device, the artifact cryptographic digest to a block chain of the server device; and
adding, at the server device, the artifact cryptographic digest, the artifact metadata and at least one of: a reference to a location of the first artifact and the first artifact to a data storage device of the server device separate and distinct from the block chain to reference the artifact cryptographic digest on the block chain
receiving, at the client device, a request to post citation data to the block chain at the server;
creating a citation cryptographic digest corresponding to the citation data;
adding, at the server, the citation cryptographic digest to the block chain; and adding, at the server, the citation data and the citation cryptographic digest to the data storage device;

storing, at the server, an author attribution count for each author of the one or more artifacts stored on at least one of: the block chain and the data storage device, wherein the author attribution count is representative of a number of instances where one or more artifacts of the author has been cited by other artifacts;

after adding the citation cryptographic digest to the block chain, incrementing, at the server, the author attribution count for each author of a respective artifact cited in the citation data.

2. The system of claim 1, wherein the at least one processor is further caused to perform the steps of:

reading and inspecting, at the client device, citation data in the first artifact corresponding to a citation to a second artifact;

transmitting, at the client device, the citation data to the server;

determining, at the server, whether the citation data matches metadata for any artifacts stored at the server;

if the citation data matches metadata at the server, sending, at the server, a citation match message to the client device; and if the citation data does not match metadata at the server, sending, at the server, a citation non-match message to the client device.

3. The system of claim 1, wherein the at least one processor is further caused to perform the steps of:

storing, at the server, an unmatched citation, wherein an unmatched citation cites to a second artifact that does not include a respective artifact cryptographic digest stored on the block chain;

after storing the unmatched citation, receiving, at the server, an artifact cryptographic digest corresponding to the second artifact;

comparing, at the server, the unmatched citation to the second artifact and detecting a match;

incrementing, at the server, the author attribution count for each author of the second artifact.

4. The system of claim 1, wherein the at least one processor is further caused to perform the steps of:

receiving, at the client device, a request to create a new version of the first artifact;

creating, at the client device, an artifact cryptographic digest corresponding to the new version of the first artifact to certify existence of the new version of the first artifact;

transmitting, at the client device, the artifact cryptographic digest and artifact metadata to a server;

adding, at the server device, the artifact cryptographic digest to a block chain; and adding, at the server device, the artifact cryptographic digest, and the artifact metadata corresponding to the new version of the first artifact to the data storage device.

5. The system of claim 1, wherein the at least one processor is further caused to perform the steps of:

receiving, at the client device, a request to change artifact metadata corresponding to the first artifact;

transmitting, at the client device, the artifact cryptographic digest and artifact metadata corresponding to the first artifact to a server;

adding the artifact cryptographic digest to the block chain; and adding, at the server device, the artifact cryptographic digest and the changed artifact metadata to the data storage device.

6. A computer-implemented method comprising:

accessing, at a client device, a first artifact and artifact metadata corresponding to the artifact;

creating an artifact cryptographic digest corresponding to the artifact to certify existence of the artifact;

adding, at the server device, the artifact cryptographic digest to a block chain of the server device; and adding, at the server device, the artifact cryptographic digest, the artifact metadata and at least one of: a reference to a location of the first artifact and the first artifact to a data storage device of the server device separate and distinct from the block chain to reference the artifact cryptographic digest on the block chain receiving, at the client device, a request to post citation data to the block chain at the server;

creating a citation cryptographic digest corresponding to the citation data;

adding, at the server, the citation cryptographic digest to the block chain; and adding, at the server, the citation data and the citation cryptographic digest to the data storage device;

storing, at the server, an author attribution count for each author of the one or more artifacts stored on at least one of: the block chain and the data storage device, wherein the author attribution count is representative of a number of instances where one or more artifacts of the author has been cited by other artifacts;

after adding the citation cryptographic digest to the block chain, incrementing, at the server, the author attribution count for each author of a respective artifact cited in the citation data.

7. The method of claim 6, further comprising:

reading and inspecting, at the client device, citation data in the first artifact corresponding to a citation to a second artifact;

transmitting, at the client device, the citation data to the server;

determining, at the server, whether the citation data matches metadata for any artifacts stored at the server;

if the citation data matches metadata at the server, sending, at the server, a citation match message to the client device; and if the citation data does not match metadata at the server, sending, at the server, a citation non-match message to the client device.

8. The method of claim 6, further comprising:

storing, at the server, an unmatched citation, wherein an unmatched citation cites to a second artifact that does not include a respective artifact cryptographic digest stored on the block chain;

after storing the unmatched citation, receiving, at the server, an artifact cryptographic digest corresponding to the second artifact;

comparing, at the server, the unmatched citation to the second artifact and detecting a match;

incrementing, at the server, the author attribution count for each author of the second artifact.

9. The method of claim 6, further comprising:

receiving, at the client device, a request to create a new version of the first artifact;

creating, at the client device, an artifact cryptographic digest corresponding to the new version of the first artifact to certify existence of the new version of the first artifact;

transmitting, at the client device, the artifact cryptographic digest and artifact metadata to a server;

adding, at the server device, the artifact cryptographic digest to a block chain; and adding, at the server device, the artifact cryptographic digest, and the artifact metadata corresponding to the new version of the first artifact to the data storage device.

10. The method of claim 6, further comprising:

receiving, at the client device, a request to change artifact metadata corresponding to the first artifact;

transmitting, at the client device, the artifact cryptographic digest and artifact metadata corresponding to the first artifact to a server;

adding the artifact cryptographic digest to the block chain; and adding, at the server device, the artifact cryptographic digest and the changed artifact metadata to the data storage device.

\* \* \* \* \*